Feb. 26, 1952  P. E. CAVANAGH  2,587,113

PROCESS FOR REDUCING METAL OXIDES

Filed June 20, 1950

Inventor
PATRICK E. CAVANAGH
By: Fetherstonhaugh & Co.
Att'ys

Patented Feb. 26, 1952

2,587,113

UNITED STATES PATENT OFFICE 2,587,113

PROCESS FOR REDUCING METAL OXIDES

Patrick E. Cavanagh, Toronto, Ontario, Canada, assignor to Ontario Research Foundation, Toronto, Ontario, Canada, a corporation of Ontario Application June 20, 1950, Serial No. 169,275

5 Claims. (Cl. 75—33)

This invention relates to the reduction of metallic ores and oxides and is more particularly concerned with the reduction of the various iron ores and oxides to produce sponge iron.

One prior method of reducing metallic ores and oxides employed almost exclusively in the production of sponge iron required the placing of the ore or oxide in briquette or other form within a sagger or similar receptacle. The sagger was then filled with powdered carbonaceous material and subjected to a predetermined temperature for a sufficient period of time to entirely reduce the ores or oxides yielding a solid briquette or block of metallic iron.

I have found that the reducing agent or carbonaceous material employed in such processes act in effect as a heat insulator between the sagger and the metal ore or oxide thus limiting the overall efficiency of the process.

According to this invention the ore or oxide is distributed in the highly heated area of the sagger, that is to say, next to the walls thereof. The material is then more easily heated to a reaction temperature. The reducing agent or coke is placed in the "lower temperature regions" of the sagger, that is to say, within the central regions thereof, the temperatures at such region being sufficient to effect the generation of the necessary re-acting gases. In particular, however, the invention contemplates the distribution of a relatively small amount of coke substantially with and about the ore or oxide which acts as a re-generator of the spent re-acting gases.

It is therefore the main object of the invention to distribute the ore or oxide within the sagger along with the reducing agent generally in accordance with the temperature gradient existing from the outer walls of the sagger toward the centre thereof and wherein the major part of the reducing agent is distributed toward the lowest part of the temperature gradient and the major portion of the ore is distributed toward the higher part of the temperature gradient.

Another object of the invention is to provide an ore briquette for a sagger or like receptacle having a rosette-like pattern in cross-section but wherein the centre of the said rosette-like pattern is open and is referred to hereinafter as an open-centred rosette.

Another object of the invention is to provide a more efficient distribution of the ore or oxide within a sagger whereby the ore or oxide may be brought quickly to a re-acting temperature thereby to reduce the overall time period required for the reduction of the ore.

A still further object of the invention is to distribute the ore or oxide within a sagger as before whereby a metal-walled sagger may be employed and the temperature of the process may be reduced to about 1900° Fahrenheit in the case of the production of sponge iron thus to allow the use of metal saggers in a process having substantially the same or better overall efficiency though at reduced operating temperature than similar processes heretofore.

Other objects of the invention will be appreciated by a study of the following specification taken in conjunction with the accompanying drawings.

Figure 1:
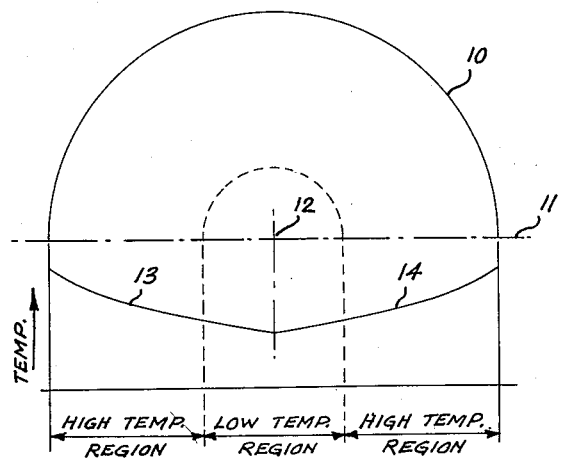
Figure 1 is a temperature gradient diagram across a sagger.

Referring specifically to the drawings and particularly Figure 1, the semi-circle 10 indicates the maximum temperature existing within a sagger immediately adjacent the inner surfaces of its walls. The portion of the diagram above the diameter line 11 illustrates the temperature gradient from the outer walls to the centre point 12 of the sagger. The lower part of the diagram shows the temperature gradient lines 13 and 14 which are indicative of the shape of the temperature gradient curve. In any case, it will be appreciated that the temperature gradient line will be very steep in slope at the start of the process but that the centre point 12 will tend to rise in temperature gradually in accordance with the heat conductivity of the material in the sagger. It has been found that with the materials placed in the sagger for the reduction of iron oxides in a sponge iron producing operation that a relatively long period of heating must be experienced before the point 12 rises to a satisfactory re-action temperature for the reduction of iron oxide. Previously, it would have been necessary to reduce the diameter of the sagger in order to decrease the processing time or to form an annular ring of the mixture to be processed, that is, the oxide and the reducing agent, within the sagger, in both cases imposing obvious limits on the efficiency of the overall process having regard to volume treated during a predetermined period of time for a required reduction factor.

According to the invention the reducible metal oxide 15 is placed within the sagger 16 in the "high temperature region" of the temperature gradient and the reducing agent 17 for the most part is placed in the "low temperature region." These regions are indicated in Figure 1 and, although not definite as regards the thermal conditions existing, are nevertheless convenient for determining the desired distribution of the materials.

In determining the extent of, say, the "high temperature region" it is necessary to compute the required amount of reducing agent to combine with the metal oxide. In the case of the production of sponge iron, a finely divided carbonaceous material such as coke is employed and the desired re-active amount for a predetermined amount of iron ore or ferrous metal oxide is determined as the case may be. The major portion of the coke is placed in the "low temperature region" and acts as a gas generator being efficient in this function at a temperature less than the desired re-acting temperature of the iron oxide or ore. It is, however, necessary to distribute some of the coke substantially with and about the iron ore or oxide in order to act as a re-generating agent. For a re-generating function the coke, as is well known, should be at a higher temperature but only a small percentage of the coke is required for this purpose, being approximately fourteen to twenty per cent by weight of the total reactive amount used.

Figure 2:
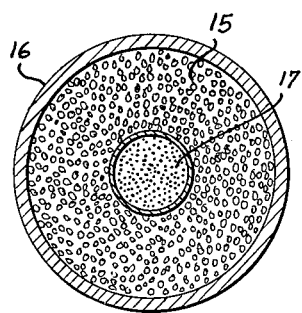
Figure 2 is a sectional view of a sagger holding an iron ore or oxide and the reducing agent therefor distributed in accordance with temperature gradients according to the invention.

Thus, in Figure 2, the reducible metal oxide 15 in the case of the production of sponge iron may be dumped into the sagger in the form of pebble-size particles along with a distribution of coke therethrough of a volume of about one-fifth by weight of the total re-active coke. The remainder of the coke is placed in the centre of the sagger in the so-called "low temperature region."

Figure 3:
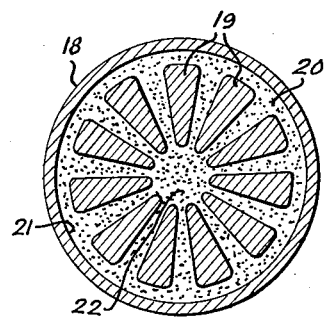
Figure 3 illustrates a method of introducing a reducible metal oxide into a sagger in the form of a plurality of briquettes arranged with the reducing agent according to the invention.

In Figure 3, an alternative method of practising the invention is illustrated in that the sagger 18 has placed therein a plurality of briquettes 19 each formed from a finely divided metal oxide incorporating a suitable binder. In this general form, the briquettes are held in spaced apart relation by a finely divided reducing agent material 20 which extends from the inner surfaces 21 of the walls of the sagger between the briquettes to fill the central or "low temperature region" 22. The general arrangement of the briquettes, as will be apparent from Figure 3, is termed hereinafter an open-centred rosette.

Figure 4:
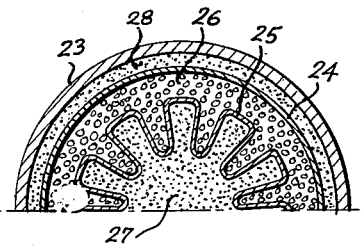
Figure 4 illustrates a modified method of packing a finely divided reducible metal oxide into a sagger along with the reducing agent and employing a sheet metal column-like device for assisting in the placing of these materials in the sagger.

In Figure 4, a further alternative is illustrated in that the sagger 23 has first placed therein a thin-walled cylinder 24 in spaced apart relation to the inner walls of the sagger. Spaced inwardly of the cylinder 24 a sheet metal member 25 is employed for assisting in the distribution of materials in the sagger. The member 25 is of general columnar form wherein the walls thereof extend inwardly to describe in transverse section an open-centred rosette formation. In use, the ore or oxide 26 is placed between the cylinder 24 and the member 25. The reducing agent is then placed in the "low temperature region" 27 as defined by the inner confines of the sheet metal member 25. The re-generating portion of the reducing agent may be placed in the annular region 28 between the cylinder 24 and the inner surfaces of the walls of the sagger 23. The cylinder 24 and member 25 are then removed, leaving the ore or oxide properly distributed within the sagger.

Figure 5:
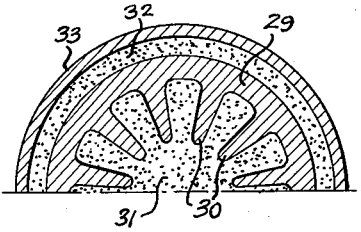
Figure 5 illustrates an alternative shaping for a single large briquette of the reducible metal oxide.

In Figure 5, a further alternative is illustrated in that the ore or oxide may be extruded in a single form 29 of annular nature in cross section having inwardly extending webs 30, in general therefore conforming to an open-centred rosette-like formation. The central regions 31 are filled with reducing agent and the outer annular space 32 is also filled with a reducing agent to separate the ore or oxide from the walls of the sagger 33.

It has been found that the re-generating portion of the reducing agent should be placed at no greater distance than about one inch from a particle of ore or oxide within a briquette in a process having a reducing action period of about thirty hours. As will be evident from Figures 3 to 5, a small portion of the reducing agent separates the ore or oxide from the inner surfaces of the walls of the sagger. This is merely the preferred arrangement since this expedient will prevent sticking of the reduced oxide to the walls of the sagger. Whereas this expedient is in nearly all cases necessary when operating with non-metallic saggers above 2000° Fahrenheit, it has been found that it may not be necessary to dispose some of the reducing agent next the walls of the sagger when operating at lower temperatures, say, 1900° Fahrenheit maximum, and with a metal sagger. In any case the radial depth of any such layer of reducing agent next the inner surfaces of the walls of the sagger should be kept to a minimum in order to develop maximum heating efficiency.

It is, of course, desirable to attain the highest temperature practical in the reducing process but when a metal sagger is employed the temperature will be limited by the softening point of the metal as well as the oxidation rate of the metal thereof.

The sulphur content in the resulting reduced oxide may be controlled in known manner by mixing limestone with the carbonaceous material in the amount of about twenty percent by weight or less of the latter.

It is intended that the present disclosure should not be construed in any limiting sense other than that indicated by the scope of the following claims.

What I claim as my invention is:

1. The process of reducing metal oxides in a sagger or like receptacle, which consists in distributing the oxide annularly within the sagger forming a tubular column of oxide in contact with the inner walls of the sagger, filling the inner opening of the tubular column of oxide with the reducing agent and heating said sagger to a temperature to effect reducing of the metal oxide.

2. The process in accordance with claim 1, in which the oxide is distributed to have an inner opening in a substantially open centered rosette pattern, the rosette pattern being filled with the reducing agent.

3. The process of reducing metal oxides in a sagger or like receptacle, comprising: placing the oxide and a reactive amount of reducing agent therefor separately into the sagger and arranging the oxide in regions directly adjacent the walls of the sagger and arranging the reducing agent mainly in regions remote from the walls of the sagger, leaving only sufficient reducing agent between the walls of the sagger and the oxide to avoid clinging of the metal obtained from the reduction of the oxide by the reducing agent, and heating the oxide and the reducing agent by applying heat to the exterior walls of said sagger to effect reduction of the metal oxide by the reducing agent.

4. The process in accordance with claim 3 in which the oxide is distributed in the form of an open-centered rosette pattern, and the reducing agent is distributed in the open-centered portion of the pattern.

5. The process in accordance with claim 3 and the step of distributing the oxide in the sagger in spaced apart regions defining a triangular shape in cross-section having the apex thereof directed toward but spaced from the center of the sagger.

PATRICK E. CAVANAGH.

REFERENCES CITED

The following references are of record in the file of this patent:

UNITED STATES PATENTS

| Number | Name | Date |
|---|---|---|
| 1,581,898 | Wetherbee | Apr. 20, 1926 |
| 1,894,523 | Samuel | Jan. 17, 1933 |
| 2,048,113 | Gahl | July 21, 1936 |
| 2,386,072 | Stewart | Oct. 2, 1945 |